(12) United States Patent
Koganezawa

(10) Patent No.: US 8,786,798 B2
(45) Date of Patent: Jul. 22, 2014

(54) LIQUID CRYSTAL DISPLAY DEVICE

(75) Inventor: Nobuyuki Koganezawa, Chiba (JP)

(73) Assignee: Japan Display Inc., Tokyo (JP)

( * ) Notice: Subject to any disclaimer, the term of this patent is extended or adjusted under 35 U.S.C. 154(b) by 330 days.

(21) Appl. No.: 13/402,929

(22) Filed: Feb. 23, 2012

(65) Prior Publication Data

US 2012/0218492 A1 Aug. 30, 2012

(30) Foreign Application Priority Data

Feb. 25, 2011 (JP) ................................. 2011-039497

(51) Int. Cl.
*G02F 1/1333* (2006.01)

(52) U.S. Cl.
USPC ..................... 349/58; 349/59; 349/60; 345/87

(58) Field of Classification Search
CPC ............... G02F 1/133308; G02F 1/133608; G02F 2201/503; G02F 1/133615
USPC ..................................... 349/58–60
See application file for complete search history.

(56) References Cited

U.S. PATENT DOCUMENTS

| | | | |
|---|---|---|---|
| 2010/0020261 A1* | 1/2010 | Oohira | 349/58 |
| 2010/0073582 A1* | 3/2010 | Konno et al. | 348/794 |
| 2010/0156945 A1 | 6/2010 | Yoshida | |
| 2012/0242925 A1* | 9/2012 | Watanabe | 349/58 |

FOREIGN PATENT DOCUMENTS

WO  WO 2008/062575 A1  5/2008

* cited by examiner

*Primary Examiner* — Huyen Ngo

(74) *Attorney, Agent, or Firm* — Antonelli, Terry, Stout & Kraus, LLP.

(57) ABSTRACT

The present invention provides a liquid crystal display device having a liquid crystal display panel of which the outer shape in a plane has at least one corner that is not 90° (dotted line A), and is characterized in that cushion tapes (CT3, CT4) are placed along the sides of the outer shape of the liquid crystal display panel between the liquid crystal display panel LCP and a frame for supporting the liquid crystal display panel, and the cushion tapes along the two sides connected to the above-described corner that is not 90° are made to make contact with each other, and the width of an end of the cushion tape along at least one side is smaller than the width of the cushion tape along the middle of the side.

4 Claims, 5 Drawing Sheets

PRIOR ART

LIQUID CRYSTAL DISPLAY DEVICE

CROSS-REFERENCE TO RELATED APPLICATION

The present application claims priority over Japanese Application JP2011-039497 filed on Feb. 25, 2011, the contents of which are hereby incorporated into this application by reference.

BACKGROUND OF THE INVENTION (1) Field of the Invention

The present invention relates to a liquid crystal display device, and in particular, to a liquid crystal display device in an irregular form (that is, not rectangular) where the outer shape of the liquid crystal display panel in a plane has at least one corner that is not 90°.

(2) Description of the Related Art

In conventional liquid crystal display devices, a rectangular liquid crystal display panel is generally used. Recently, however, liquid crystal display devices in an irregular form where the outer shape of the liquid crystal display panel in a plane has a corner that is not 90° have been required for large scale monitors, display devices for entertainment, display devices for industrial machinery, and liquid crystal display devices mounted in cars.

International Unexamined Patent Publication WO2008/062575 is a prior art document that shows an example of a liquid crystal display device in an irregular form. FIG. 1 shows a liquid crystal display panel LCP used for a liquid crystal display device in an irregular form and how cushion tapes (CT1, CT2) are pasted to the rear of the liquid crystal display panel. AR denotes the image display area.

As shown in FIG. 3, which is a cross-sectional diagram along single-dotted chain line B-B' of FIG. 1, the cushion tapes (CT1, CT2) are placed between the liquid crystal display panel LCP and the frame FR for supporting the liquid crystal display panel so as to prevent foreign substances or dust from entering between the liquid crystal display panel and the backlight BL. In addition, such cushion tapes are used in lateral electrical field type liquid crystal display panels in order to prevent external stress from being applied to a local area.

In the case where a liquid crystal display device is rectangular, cushion tapes are pasted along the four sides of the outer shape of the liquid crystal display panel so that the cushion tapes are made to make close contact with each other in the corners of the outer shape, which makes it possible for the path through which foreign substances enter to be shielded. However, as shown in FIG. 1 and FIG. 2, which shows an enlargement of the dotted portion A in FIG. 1, liquid crystal display devices in an irregular form have a liquid crystal display panel with corners that are not 90° (elliptical dotted line portion in FIG. 1). As shown in FIG. 2, a gap (arrow C) is created between the cushion tapes (CT1, CT2) in these corners, which may allow a foreign substance to enter.

SUMMARY OF THE INVENTION

An object to be achieved by the present invention is to solve the above-described problem and to provide a liquid crystal display device in irregular form where no gap is created between cushion tapes in corners that are not 90°.

In order to achieve the above-described object, the liquid crystal display device in irregular form according to the present invention has the following technical features.

(1) A liquid crystal display device having a liquid crystal display panel of which an outer shape in a plane has at least one corner that is not 90° is characterized in that cushion tapes are placed along sides of the outer shape of the liquid crystal display panel between the liquid crystal display panel and a frame for supporting the liquid crystal display panel, and the cushion tapes along two sides connected to the above-described corner that is not 90° are made to make contact with each other, and a width of an end of the cushion tape along at least one side is smaller than the width of the cushion tape along the middle of the side.

(2) The liquid crystal display device according to the above (1) is characterized in that the end of the cushion tape is round.

(3) The liquid crystal display device according to the above (1) or (2) is characterized in that the frame supports a backlight.

(4) The liquid crystal display device according to any of the above (1) to (3) is characterized in that the liquid crystal display panel is of a lateral electrical field type.

In the liquid crystal display device in irregular form according to the present invention, in a corner that is not 90°, the cushion tapes along the two sides connected to the corner are made to make contact with each other, and the width of an end of the cushion tape along at least one side is smaller than the width of the cushion tape along the middle of the side, and therefore, the cushion tapes can be made to make close contact with each other even in the corner that is not 90°, and thus, it is possible to prevent a gap from being created between the cushion tapes.

BRIEF DESCRIPTION OF THE DRAWINGS

FIG. 5A shows a prior art and FIGS. 5B to 5E show examples that are applicable to the liquid crystal display device in irregular form according to the present invention;

DESCRIPTION OF THE EMBODIMENTS

In the following, the liquid crystal display device in irregular form according to the present invention is described in detail.

The present invention provides a liquid crystal display device having a liquid crystal display panel of which the outer shape in a plane has at least one corner that is not 90° (dotted line A in FIG. 4), and is characterized in that cushion tapes (CT3, CT4) are placed along the sides of the outer shape of the liquid crystal display panel between the liquid crystal display panel LCP and a frame for supporting the liquid crystal display panel, and the cushion tapes along the two sides connected to the above-described corner that is not 90° are made to make contact with each other, and the width of an end of the cushion tape along at least one side is smaller than the width of the cushion tape along the middle of the side.

Figure 5A:
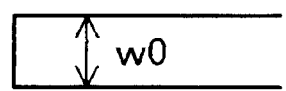
FIGS. 5A to 5E are diagrams showing the forms of the ends of cushion tapes, where
Figure 5B:
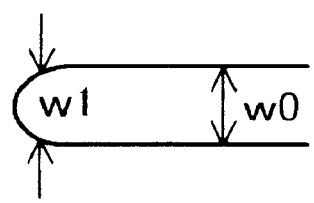
Figure 5C:
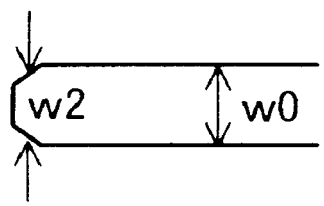
Figure 5D:
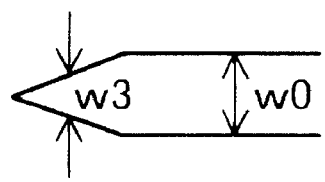
Figure 5E:
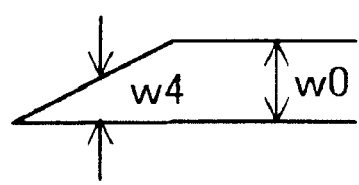

The cushion tapes are made by providing an adhesive layer to both sides of a base, such as of sponge, which can change its form elastically. FIGS. 5A to 5E show examples of the form of the ends of cushion tapes used in the present invention. FIG. 5A shows an end of a conventional cushion tape, and in the present invention, as shown in FIGS. 5B to 5E, the cushion tape is formed such that the width w1 to w4 of an end is smaller than the width w0 of the middle portion. FIG. 5B shows a round end, FIG. 5C shows a trapezoidal end, and FIGS. 5D and 5E show tapered ends.

Figure 4:
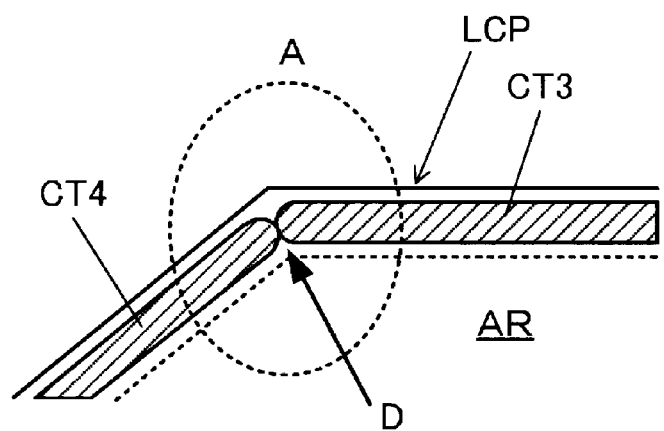
FIG. 4 is a diagram (part 1) showing the state of cushion tapes making contact with each other in a corner that is not 90° in the liquid crystal display device in irregular form according to the present invention.

FIG. 4 shows a state where cushion tapes (CT3 and CT4) with round ends, as in FIG. 5B, are placed so as to make contact with each other. The present invention is not limited to this and may provide an implementation where only one cushion tape has a round end.

Figure 6:
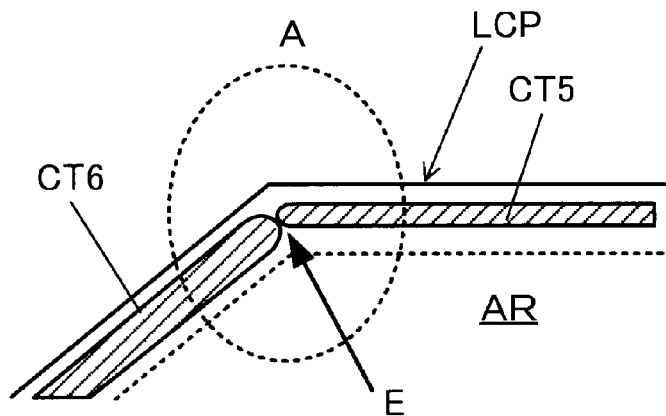
FIG. 6 is a diagram (part 2) showing the state of cushion tapes making contact with each other in a corner that is not 90° in the liquid crystal display device in irregular form according to the present invention.

Unlike the embodiment in FIG. 4, the width of one cushion tape CT5 is smaller than that of the other cushion tape CT6 in the embodiment in FIG. 6. In addition, FIG. 7 shows a structure where a cushion tape, as in FIG. 5E, is used in such a manner that the end of the cushion tape CT8 is bent along the end of the other cushion tape CT7.

Figure 7:
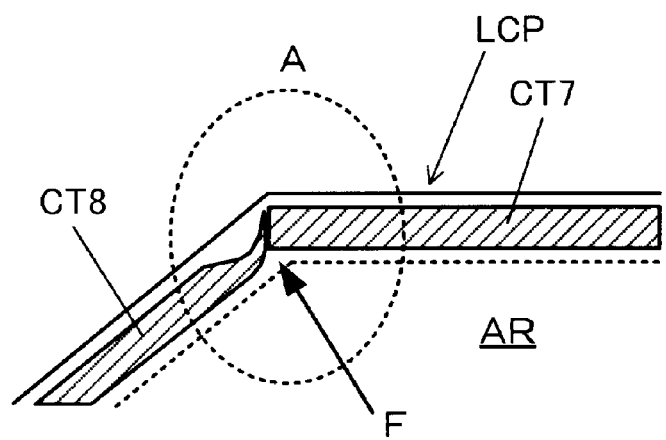
FIG. 7 is a diagram (part 3) showing the state of cushion tapes making contact with each other in a corner that is not 90° in the liquid crystal display device in irregular form according to the present invention.

By adopting the structures shown in FIGS. 4 to 7, the present invention makes it possible for the ends of cushion tapes to be placed so as to make close contact with each other even in an angle that is not 90° so that a gap through which a foreign substance may enter can be prevented from being created, as indicated by the arrow D in FIG. 4, the arrow E in FIG. 6 and the arrow F in FIG. 7.

Figure 1:
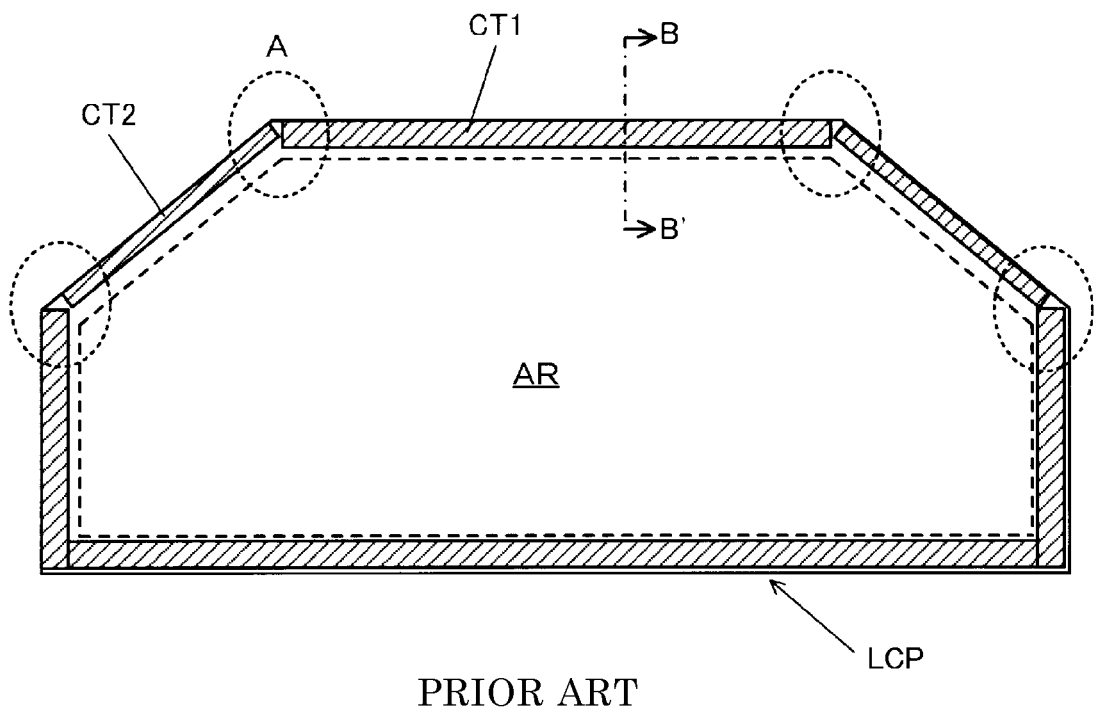
FIG. 1 is a plan diagram showing the positional relationship between the liquid crystal display panel and cushion tapes in a conventional liquid crystal display device in irregular form.
Figure 2:
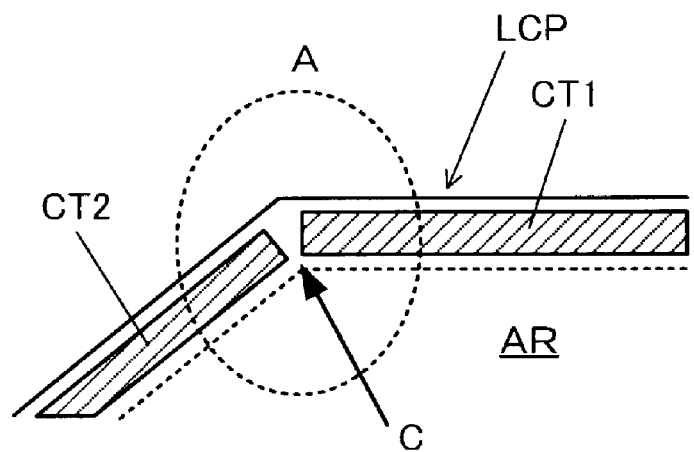
FIG. 2 is a diagram showing an enlargement of dotted line A in FIG. 1.
Figure 3:
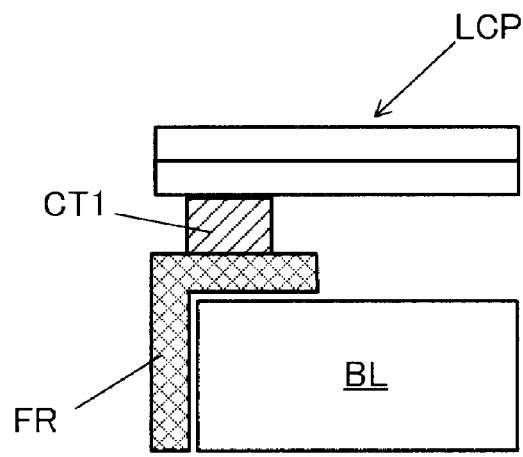
FIG. 3 is a cross-sectional diagram along single-dotted chain line B-B' in FIG. 1.

As shown in FIG. 3, the liquid crystal display device in irregular form according to the present invention makes it possible to join the liquid crystal display panel LCP to the frame FR through the cushion tapes on the rear surface of the liquid crystal display panel so that the frame supports the liquid crystal display panel. It is also possible for the frame FR to support the backlight BL. Furthermore, it is possible to use a mold, which is a frame part that forms the backlight, as the frame according to the present invention.

In addition, it is possible and preferable to apply the present invention to a liquid crystal display device in irregular form where a lateral electrical field type liquid crystal display panel is used as the liquid crystal display panel.

As described above, the present invention can provide a liquid crystal display device in irregular form where no gap is created between cushion tapes even in a corner that is not 90°.

What is claimed is:

1. A liquid crystal display device, comprising a liquid crystal display panel of which an outer shape in a plane has at least one corner that is not 90°, wherein
   cushion tapes are placed along sides of the outer shape of the liquid crystal display panel between the liquid crystal display panel and a frame for supporting the liquid crystal display panel, and
   the cushion tapes along two sides connected to said corner that is not 90° are made to make contact with each other, and a width of an end of the cushion tape along at least one side is smaller than the width of the cushion tape along the middle of the side.

2. The liquid crystal display device according to claim 1, wherein the end of the cushion tape is round.

3. The liquid crystal display device according to claim 1, wherein the frame supports a backlight.

4. The liquid crystal display device according to claim 1, wherein the liquid crystal display panel is of a lateral electrical field type.

* * * * *